United States Patent

Wilson

[15] 3,637,465

[45] Jan. 25, 1972

[54] DISTILLATION METHOD HAVING COUNTERFLOW HEAT EXCHANGE WITH CONDENSATE

[72] Inventor: James D. Wilson, 902 Marine St., Boulder, Colo. 80302

[22] Filed: Aug. 6, 1969

[21] Appl. No.: 850,325

Related U.S. Application Data

[63] Continuation of Ser. No. 582,147, Sept. 26, 1966, abandoned.

[52] U.S. Cl. ..........................203/11, 159/13 R, 202/185 R, 202/187, 202/236, 203/26, 203/DIG. 4, 203/DIG. 17

[51] Int. Cl. .....................................B01d 3/00, C02b 1/06

[58] Field of Search...............202/185, 185.2, 160, 205, 233, 202/235, 236, 187; 203/10, 11, 1, 7, DIG. 4, DIG. 17, 20, 26; 159/13, 15

[56] References Cited

UNITED STATES PATENTS

| 3,192,130 | 6/1965 | Pottharst, Jr. .........................202/160 |
| 3,214,351 | 10/1965 | Lichtenstein et al. ................202/185 |
| 3,248,306 | 4/1966 | Cummings .........................202/185 X |
| 3,311,543 | 3/1967 | Loebel..................................202/160 |
| 3,312,600 | 4/1967 | Morton.................................202/160 |
| 3,329,583 | 7/1967 | Othmer.....................................203/10 |
| 3,394,055 | 7/1968 | Ludwig....................................203/11 |

FOREIGN PATENTS OR APPLICATIONS

| 24,930 | 12/1956 | Germany................................203/11 |
| 683,480 | 3/1964 | Canada...................................203/10 |

*Primary Examiner*—Norman Yudkoff
*Assistant Examiner*—F. E. Drummond
*Attorney*—Head and Johnson, Robert B. Russell and Henry C. Nields

[57] ABSTRACT

A distillation method and apparatus which may be used in making potable water from sea water. The input liquid is circulated in a system wherein the heat of evaporation is recovered as the heat of condensation from the condenser is returned to the evaporator. The heat required to bring the raw liquid to the boiling point is supplied by heat exchange between the leaving condensate and/or concentrate with the entering raw liquid.

3 Claims, 4 Drawing Figures

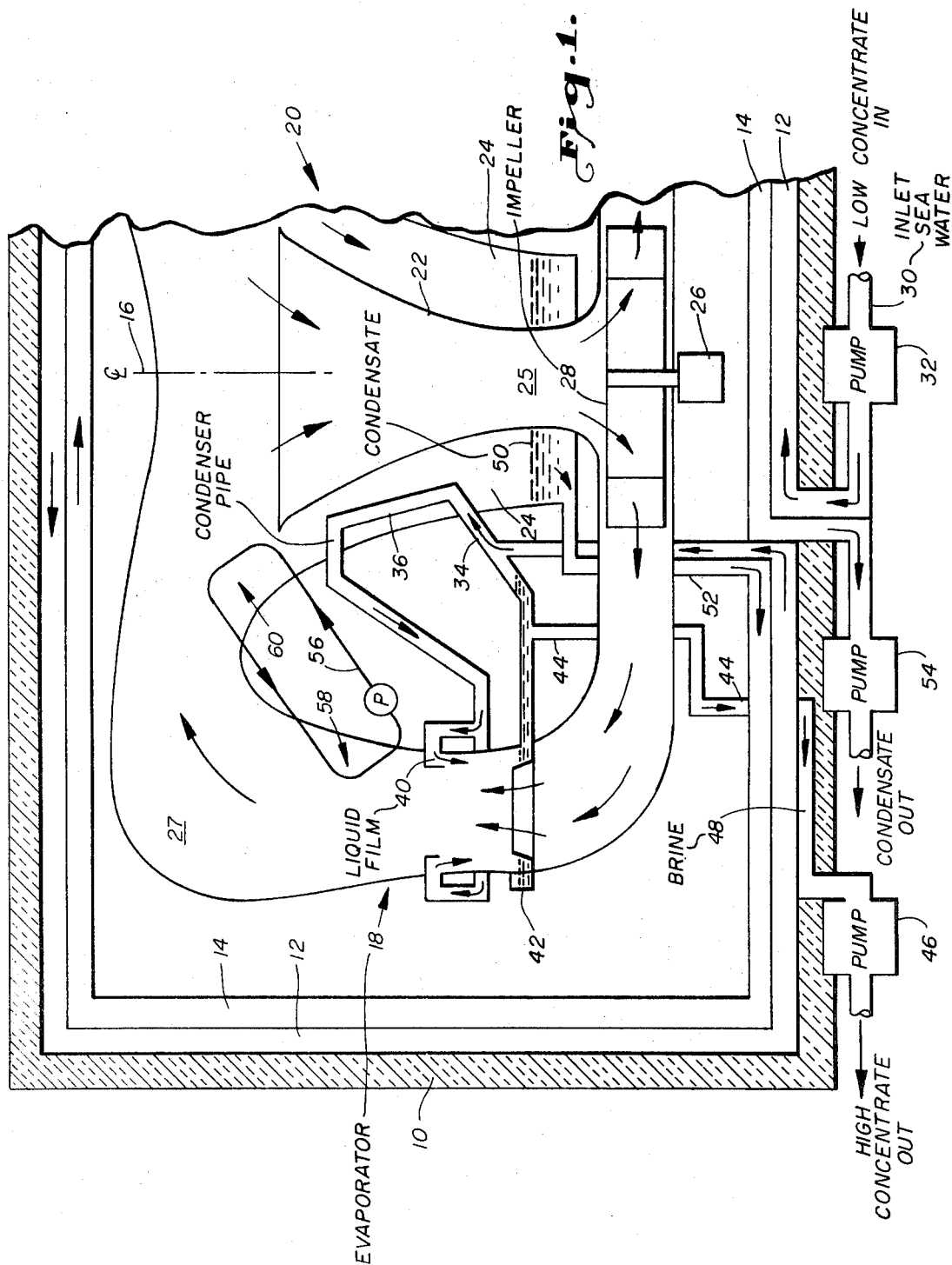

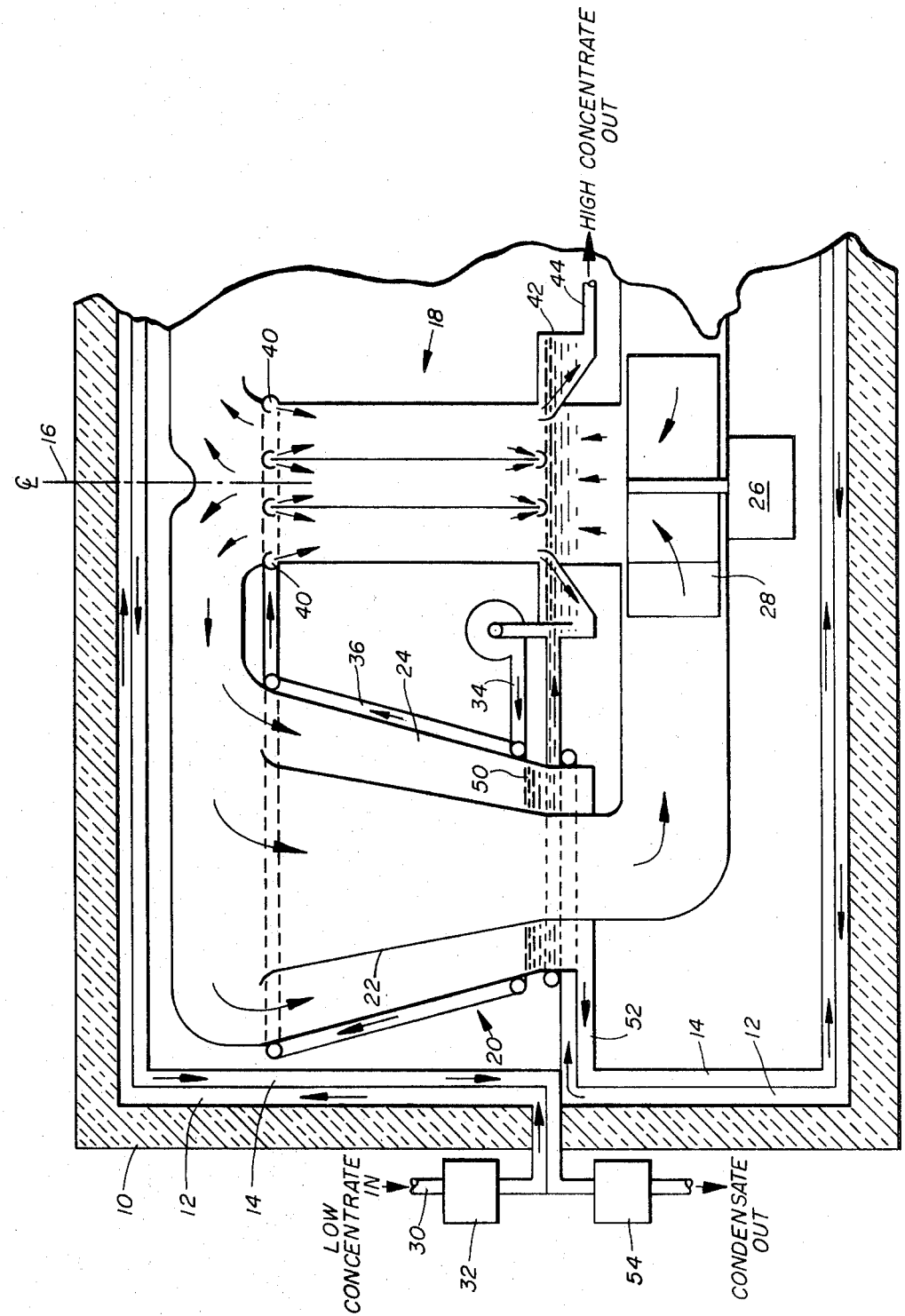

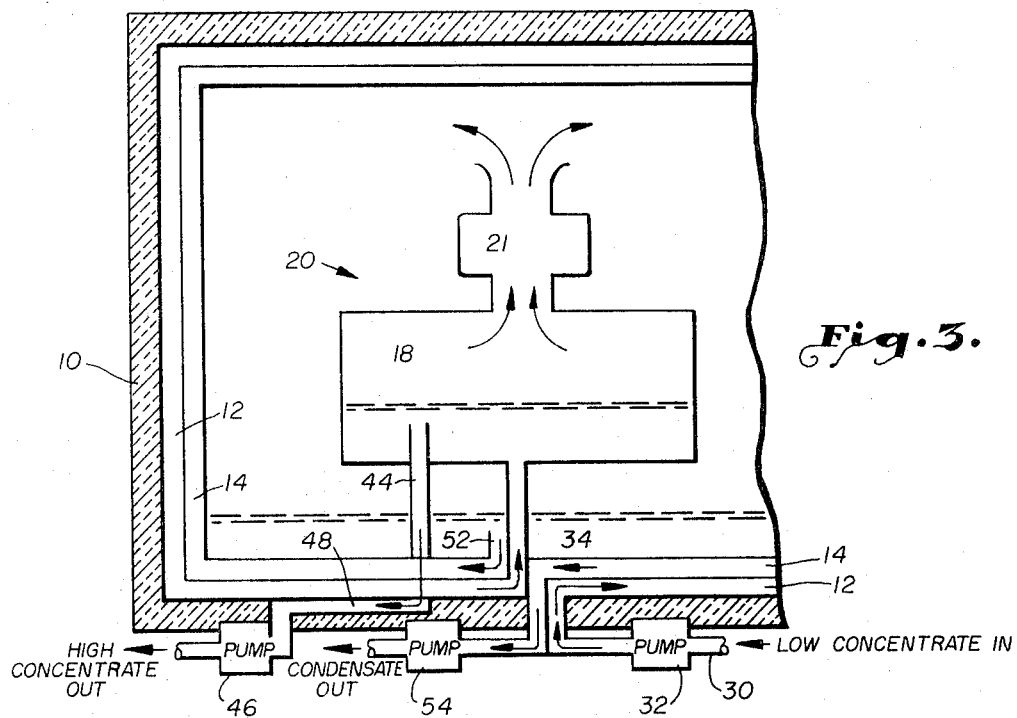
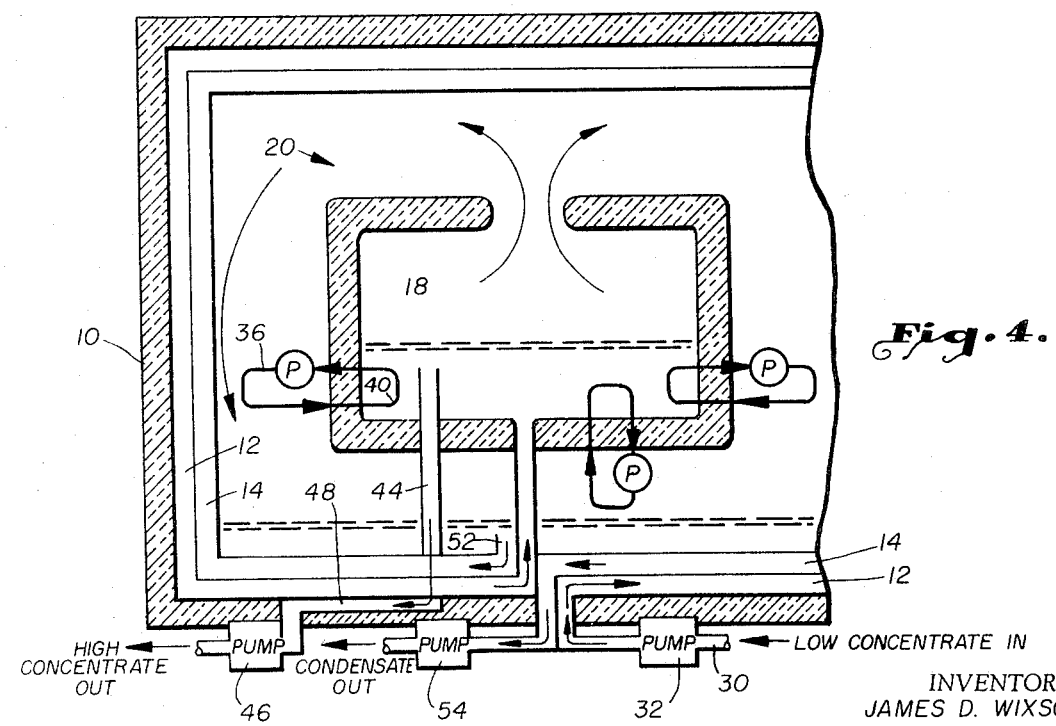

DISTILLATION METHOD HAVING COUNTERFLOW HEAT EXCHANGE WITH CONDENSATE

This application is a continuation of application Ser. No. 582,147, filed Sept. 26, 1966, now abandoned.

This invention relates to a distillation method and apparatus, more particularly to a method and apparatus for distilling a liquid under conditions which are near theoretically optimum heat recovery.

A typical object of such distillation process is to make potable water from sea water or water otherwise contaminated with impurities. High operating costs have evolved in most prior art processes which have a sufficiently high output rate to be commercially interesting, primarily because of high energy consumption.

It is a primary object of this invention to provide a distillation system which reduces the energy necessary to produce a unit mass of distilled liquid to an amount which is near the theoretical minimum.

A further object of this invention is to provide a distillation system of either large or small scale, which yields a cheap, pure condensate.

It is another object to provide a distillation system in which heat flows from the fluid being cooled to the fluid being heated in a manner which is essentially recirculating counterflow exchange. This specifically includes (1) counterflow heat exchange between the raw liquid entering the system on one hand and the condensate and concentrate leaving the system on the other; (2) recovery of heat of condensation from the condenser and reintroduction of this heat into the evaporator; (3) counterflow heat exchange from the cooling superheated gas or steam to that vapor which has just evaporated and is being superheated to remove entrained impurities.

These and other objects of the invention for obtaining the highest possible quantity of liquid recovered from its solution per energy cost at a high mass rate of flow will become more apparent upon further reading of the specification and claims, taken in conjunction with the following illustrations, of which:

FIG. 1 is a diagrammatic illustration and flow diagram of the method and an apparatus incorporating the basic concepts of this invention.

FIG. 2 is a diagrammatic illustration representing an alternate embodiment of the apparatus of FIG. 1.

FIGS. 3 and 4 are diagrammatic illustrations of the basic principles of this invention according to alternative methods for accomplishing the invention.

The apparatuses of all the figures generally include an insulated housing 10 in which the internal walls consist of many layers of concentrically arranged heat exchanger surfaces. Diagrammatically, this is shown as spaces 12 and 14 which are in heat transfer relationship with each other. Interior thereto is an interconnected evaporator and condenser. The evaporator is generally designated by the numeral 18 while the condenser is generally designated by the numeral 20. The evaporator in the embodiment of FIG. 1 is designed to provide for diverging flow and the condensing section 20 provides for converging flow of the recirculating vapor. The latter includes a converging nozzle portion 22 and a condensation or stagnation chamber portion 24 which surrounds the converging nozzle portion and is in heat transfer relationship therewith. The diagram shows only one nozzle; in actual construction a multiplicity of converging nozzles may be surrounded by the stagnation chamber 24. A motor 26 is adapted to drive an impeller 28 for the continuous circulation of vapor between the evaporator and condenser, as shown by the arrows. Other apparatus includes inlet 30 and pump 32 which connect with heat exchanger wall 12. Flow continues interiorly into conduit 34. This conduit is a part of a circuit by means of which the raw solution at boiling temperature is recirculated through the evaporator, perhaps flowing along its walls as shown at 40, optionally countercurrent to the vapors passing through the diverging nozzle as shown by the arrows. This liquid flow may in some instances be a falling film of boiling liquid, the unevaporated portion of which drops into receiving tray 42 and is recirculated. Some of this highly concentrated liquid is thereafter removed through conduit 44 at a rate dependent upon the desired concentration of the recirculating liquid. This concentrate leaves through pump 46. It will normally be desirable to utilize the heat of said concentrate by a heat transfer, diagrammatically shown at 48, whereby its heat is transferred to and increases that temperature of the incoming raw solution in zone 12.

Condensate designated by the numeral 50 is removed from the stagnation chamber 24, passing through conduit 52 and thence into the second annular zone 14, to finally exit through pump 54.

For the purpose of illustration, if a pressure greater than atmospheric exists, pumps 46 and 54 are hydraulic motors to recover the work of pump 32. If the evaporator pressure is less than atmospheric, then 46 and 54 become pumps and 32 is a hydraulic motor.

Typical operation is described with reference to producing potable water from sea water. This involved pumping the sea water from inlet 30 by pump 32 into zone 12, which is in heat transfer relationship with zone 14. This zone 14 contains condensate which yields up its heat as it flows toward pump 54. Flow through the heat exchanger wall, typified by zones 12 and 14 within the insulated housing 10, has raised the temperature of the sea water to nearly its boiling temperature at the point where it enters conduit 34. Additional heat is added each time it passes through conduit 36, located in the higher temperature stagnation zone 24, thereupon the nearly boiling liquid flows through inlet 40, there falling countercurrent to the vapors within the diverging zone. Unevaporated concentrate collects in tray 42, a portion of it is thereafter removed from the system in a predetermined mass ratio to the entering liquid, through conduit 44 and heat exchanger 48, by means of pump 46. In the evaporator 18 the recirculating steam slows; its temperature rises to slightly above the boiling temperature of the recirculating liquid 40. Thus heat is transferred from the recirculating vapor to the recirculating liquid. This vapor together with the newly generated vapor passes to the widest point of the diverging chamber. At this point, indicated by the numeral 27, flow is quite slow and a substantial degree of superheat may be achieved. Such superheat may be provided by a suitable external heat source (not shown). A recirculating counterflow heat exchanger 56, 58, 60 would assist in such superheating, drawing heat from the steam approaching the condenser 20 and transporting it to the steam leaving the evaporator 18. In certain cases said heat exchanger 56, 58, 60 may be operated as a heat pump so as to provide sufficient superheat without the need for an external heat source for this purpose. The flow then continues into the condenser. Here a portion of the vapor is diverted into the stagnation zone 24 and yields up its heat of condensation to exchanger 36 and nozzle 22, resulting in condensate or potable water 50 which is thereafter removed from the system. This condensate passes through conduit 52 into zone 14 where it is in heat exchange with the incoming raw liquid in zone 12. The remaining portion of the vapor continues its circulation into the converging nozzle portion 22 of the condensing chamber where its velocity increases substantially and its temperature decreases to somewhat below the condensation temperature of the stagnant vapor. The nozzle or nozzles represented by the numeral 22 conduct heat from stagnation zone 24 into this recirculating steam. Thus, the heat of evaporation is removed from the vapor in stagnation zone 24 and the steam in zone 24 condenses and collects at 50. Vapor in conduit 25, 27 is maintained in circulation by impeller 28. As it leaves the throat 25 of nozzle 22 the conduit widens and the vapor slows down, increasing in temperature to somewhat above that of the recirculating liquid in section 40 of the evaporator. Thus, the heat of condensation acquired in nozzle 22 is returned as heat of evaporation to evaporator 18. The vapor flow path is to be everywhere designed for minimum flow drag. The evaporator and the condenser are thus connected by an aerodynamically efficient, continuous, closed conduit or path wherein vapor remains in constant flow. Temperature conditions within the system may be initially established by means of, for example, a heating coil, not shown, which also continuously provides the additional heat necessary to replace any losses. The provision for a small cross-sectional area in the converging nozzle 22 of the condenser and a large cross-sectional area in the evaporator 18 insures that the vapor temperature will be slightly less than condensation temperature at nozzle 22 yet slightly greater than evaporation temperature in the evaporator 18. Flow through the converging nozzle causes acceleration, decreased pressure and temperature of the vapor within it, and causes absorption of heat from chamber 24 through the conducting nozzle walls. In throat 25 the vapor is at its highest velocity and lowest temperature. The provision for a stagnation zone in which the converging nozzle is surrounded with vapor permits the heat of evaporation to be conducted from the condenser through the conduit walls to the vapor inside and transported therewith to the evaporator, where it passes into the incoming solution. Here this heat causes some of said solution to evaporate, and the resultant vapor joins that already within the evaporator conduit. A counterflow heat exchange system 56 is diagrammatically shown in FIG. 1 as a means by which the vapor leaving the evaporator 18 may be superheated in zone 58 and this superheat subsequently removed in zone 60.

The alternate embodiment illustrated in FIG. 2 encompasses the general aspects of this invention as described in FIG. 1 with like numerals being given to the same or functionally related parts. In this particular instance, however, the vapor flow direction is opposite to that shown in FIG. 1 and the evaporator in this instance is a cylindrical type, although it is to be understood that a diverging nozzle effect may also be embodied in this design similar to that shown in FIG. 1. All other aspects of that other embodiment remain the same.

Alternative embodiments illustrated in FIGS. 3 and 4 encompass the general aspects of this invention as described in FIG. 1 with like numerals being given to the same or functionally related parts, with exceptions to be described. Basic to all embodiments is the surrounding annular heat exchanger. The embodiments of FIGS. 3 and 4, however, replace the recirculating vapor evaporator and condenser arrangement of FIGS. 1 and 2, but may retain the superheat arrangement of these latter figures.

In FIG. 3, raw liquid at substantially boiling temperature is fed into the evaporator 18, which is centrally located in the apparatus and is surrounded by the condenser 20. This evaporator has heat conducting walls of surface area sufficient to the desired heat transfer and is connected to a compressor 21 which operates either in steady or intermittent flow.

This compressor causes a pressure increase of the vapor flowing into the condenser 20 so that the temperature in the latter is increased sufficiently to allow the desired rate of heat transfer from the condenser through the walls of and into the evaporator 18. Thus, heat of condensation is removed from the vapor in condenser 20 and is simultaneously added to the liquid in evaporator 18, where it supplies the heat of evaporation to a quantity of liquid equivalent to the quantity of vapor condensing.

An intent of this process is that the temperature and pressure differential be held low enough that the heat transfer occurs nearly isothermally.

A certain proportion of the liquid in the evaporator must be removed, again in counterflow heat transfer, with the incoming raw liquid, in order to prevent an excessive accumulation of solute in the evaporator.

Heat losses may be made up by having a heat source, such as a heating coil, which is connected to an external source, and located in the evaporator. A system of check and float valves will prevent reverse flow and maintain the proper liquid levels in evaporator 18 and condenser 20.

In FIG. 4 raw liquid at substantially boiling temperature is fed into the evaporator 18 which is centrally located in the apparatus and is surrounded by the condenser 20. This evaporator has insulated walls through which at least one heat pump with its circulating system penetrates. The heat pump with its system removes heat from the vapor in the condenser 20 through that portion 36 of its conduit which is in heat exchange with the vapor in condenser 20. The recirculating medium bearing this heat is then raised in temperature, by means of externally supplied energy, sufficient to cause flow of this heat to the raw liquid in the evaporator. Heat then flows from that portion 40 of the heat exchanger conduit which is in heat exchange with the raw liquid in evaporator 18. Again, exchanger surface areas are to be everywhere sufficiently large to keep temperature differentials between heated and heating media to the lowest practical amount, consistent with desired rate of heat transfer, so that the heat transfer between the condenser and the evaporator approaches isothermal. As the raw liquid evaporates, it leaves the evaporator, which communicates by means of an opening with the condenser, and vapor flows into the surrounding evaporator. In this case, the evaporator and the condenser are at the same pressure.

Again, a certain proportion of the liquid in the evaporator must be removed as concentrate and its heat yielded to the inflowing raw liquid. Heat losses are made up as needed by supplying external heat, and a system of check and float valves are provided to prevent reverse flow and maintain proper liquid levels.

Theoretically this invention approaches the effect and purposes of using counterflow heat transfer to bring a raw solution to its boiling temperature and to recover this heat from the leaving liquids. Further, the heat of evaporation is supplied by recovering the heat of condensation from a given weight of vapor, raising the temperature of the medium bearing this heat by the alternative means discussed, and returning this heat to the raw solution, which has previously been raised to near boiling temperature. If any and all heat losses are made up from external sources, the heat of evaporation is supplied to essentially an equal weight of raw solution, which converts the latter to steam. Essential to the operation of this invention is the maintenance of desired temperature differentials at all heat transfer locations.

Entropy losses are minimized by everywhere transferring heat between media which are close in temperature to one another. Other energy losses are substantially eliminated by recovering the pump work and by providing that the leaving liquids be at substantially the temperature of the entering liquid.

Also essential is that the temperature of the outside wall of the apparatus be very close to ambient. This is provided for by insulation 10 and by having the outermost passage of the heat exchanger wall 12 be filled with raw liquid at substantially ambient temperature.

Wherever this method has been described with respect to desalting sea water, it should be understood that the method is nevertheless applicable to any distillation process involving any liquids and that such are to be considered within the scope of the appended claims.

As used herein and in the claims, the following terms are defined:

Raw Liquid: that undistilled liquid whose solute is to be removed.

Concentrate: that liquid removed undistilled from the evaporator whose concentration of solute is significantly higher than that of the raw liquid.

Condensate: that pure distilled liquid which results from evaporating the raw liquid.

I claim:

1. The method of purifying a liquid by distillation, which method comprises evaporating distilland in an evaporation region to form a vapor, condensing some of said vapor to form condensate in a condensation region, recirculating the rest of said vapor in the absence of any carrier except said vapor itself in a closed, endless, cyclical path which includes said evaporation region and communicates with said condensation region, which embraces a portion of said path, and varying the velocity of the vapor around the cycle so as to obtain relatively low velocity near said evaporation region and relatively high velocity near said condensation region, said zone of relatively high velocity being mechanically separated from but in heat transfer with said condensation region.

2. A method according to claim 1, wherein said closed, endless, cyclical path comprises an aerodynamically efficient, closed, recirculating vapor-flow circuit; wherein said vapor flow near said condensation region has a velocity which has been increased sufficiently that its temperature at some point within said zone of high velocity is somewhat less than the condensation temperature of the vapor in said condensation region; wherein said vapor within said zone of high velocity is contained by a conduit with heat-conductive walls, so that heat will flow from said vapor in said condensation region to said vapor in said flow path and a portion of said vapor in said condensation region thereby condenses; wherein said recirculating vapor flows through said evaporation region with a velocity which has been decreased sufficiently that its temperature at some point within said evaporation region is higher than the boiling point of the liquid in said evaporation region; heat may thereby flow from said vapor in said evaporation region to said liquid in said evaporation region whereby a portion of said liquid evaporates; wherein said evaporated liquid is collected, and wherein a portion of said recirculating vapor is diverted from said path to said condensation region.

3. In a distillation method to produce substantially pure condensate and a concentrate of the solute from a raw solution such that the heat of evaporation is recovered as the heat of condensation from the condenser and returned to the evaporator, and that the heat required to bring the raw liquid to the boiling point is substantially supplied by the leaving condensate and concentrate, which are thereby colled to substantially the temperature of the entering raw liquid, comprising the steps of:

a. heating said entering raw liquid to a temperature of up to its boiling point by counterflow heat exchange with said condensate and said concentrate resulting from said distillation as said condensate and concentrate are removed from the system;
b. introducing said heated raw liquid into an evaporator;
c. causing heat to flow into said raw liquid in the evaporator thereby causing some of said liquid to vaporize and the remainder to increase in its concentration of solute;
d. transporting said vapor to a superheater;
e. supplying heat to said vapor in said superheater, causing entrained liquid to evaporate;
f. providing means to recover the solute within said entrained liquid, and to remove said solute, including means to return said solute to said concentrate;
g. placing said purified, superheated vapor in heat exchange with said vapor transported from said evaporator and within said superheater, to recover said superheat, to superheat said vapor with entrained liquid and to cool said purified, superheated vapor to near its condensation temperature;
h. transporting said cooled purified vapor to a condenser;
i. obtaining said heat supplied to said evaporator from said condenser, thereby causing some of said vapor to form said condensate; and
j. continuously cooling and removing said condensate as well as said concentrate in said counterflow heat exchange with, and to substantially the temperature of, the entering said raw liquid, said raw liquid replacing the mass of said condensate and concentrate removed.

* * * * *

UNITED STATES PATENT OFFICE
CERTIFICATE OF CORRECTION

Patent No. 3637465        Dated January 25, 1972

Inventor(s) James D. Wixson

It is certified that error appears in the above-identified patent and that said Letters Patent are hereby corrected as shown below:

Title page, at the top and in the item marked [72] correct the spelling of "Wixson".

Signed and sealed this 15th day of August 1972.

(SEAL)
Attest:

EDWARD M.FLETCHER,JR.      ROBERT GOTTSCHALK
Attesting Officer             Commissioner of Patents